United States Patent [19]

Hubbard et al.

[11] 4,337,471
[45] Jun. 29, 1982

[54] DISPOSABLE MARKERS ADAPTED FOR CONSTANT WIDTH AND CLOSE PROXIMITY TRACING

[75] Inventors: James R. Hubbard, Moorestown; George M. Sarkisian, Willingboro, both of N.J.; John J. Scanlon, Philadelphia, Pa.

[73] Assignee: Graphic Controls Corporation, Cherry Hill, N.J.

[21] Appl. No.: 191,720

[22] Filed: Sep. 29, 1980

[51] Int. Cl.³ .......................................... G01D 15/16
[52] U.S. Cl. .................................. 346/140 R; 346/49
[58] Field of Search ........... 346/140 A, 140 R, 139 C, 346/49; 401/198, 292

[56] References Cited

U.S. PATENT DOCUMENTS 3,480,372 11/1969 Kenny ................................ 401/198
3,611,430 10/1971 Watchorn ....................... 346/140 A
3,644,933  2/1972 Tullos ............................. 346/140 R
3,778,840 12/1973 Dahl ........................... 346/140 A X
4,024,547  5/1977 Raahauge ....................... 346/140 A
4,048,640  9/1977 Caldwell ........................ 346/140 A
4,100,549  7/1978 Hubbard ........................ 346/140 A
4,282,536  8/1981 Paschen .......................... 346/140 R Primary Examiner—Joseph W. Hartary
Attorney, Agent, or Firm—Ratner & Prestia

[57] ABSTRACT

Convenient disposable marker tip design minimizes marker passing distance and provides a constant width trace line independent of the angle at which the marker tip engages the writing surface. The marker tip comprises a nib shank, surrounding and supporting a nib having a partially spherical tip. The nib shank is shaped to provide maximum coverage of the nib surface and minimum passing distance between adjacent nib tips.

8 Claims, 6 Drawing Figures

DISPOSABLE MARKERS ADAPTED FOR CONSTANT WIDTH AND CLOSE PROXIMITY TRACING

BACKGROUND

This invention pertains to recording instrument marking pens and particularly to disposable markers for such pens, which markers are adapted to pass in close proximity to adjacent pens and to lay down a constant width trace notwithstanding the close proximity passage.

Recording instruments utilize a wide variety of pen designs and markers, such as "bucket" pens, "V" pens and pens with tubular stylii. Often an instrument includes two or more pens which must produce close proximity tracing. But the nature of these pen marker tips does not allow the desired closeness of passage of adjacent tips. Thus, there has been a need in the recording instrument marker field for a marker tip which can trace in extremely close proximity to another marker tip. In addition, there is a need for such a marker tip which produces a constant width trace, adapted to be read electronically (such as by electroscanning).

One effort to solve the problem, encountered with existing recorder instrument marker tips, of close proximity tracing is shown in U.S. Pat. No. 4,024,547 (Raahauge). Interference between adjacent markers, in close proximity passage, according to the Raahauge disclosure, involves angular disposition of adjacent pens and a relatively short nib shank. This may lead to the undesirable result of excessive ink evaporation through the extended exposed nib.

Thus, it is an object of the present invention to provide a recording instrument disposable marker tip with a nib shank which supports and protects the nib and which is shaped in such a manner as to allow tracing within a distance less than the diameter of a nib shank between trace lines (or less than ½ of the sum of the two nib shank diameters if the nib shanks have different diameters). A further object is to provide such a marker with minimum exposure of the nib surface to the air, to avoid evaporative ink loss through the exposed nib.

A still further object is to provide close proximity tracing markers adapted to lay down a constant width trace line independent of the angle at which the nib approaches the writing surface.

These and other objects are met by a disposable marker tip design which includes a tubular nib shank cut away (or molded as if it were cut away) in such a manner as to avoid interference with another proximate nib shank. In particular, the lower extremity of the nib shank is cut away on the side of a proximate and angularly disposed adjacent nib and nib shank. The nib shanks otherwise surround and support the writing nibs which generally draw ink from a capillary reservoir and make contact with the writing surface.

In accordance with a separate feature of the invention, the writing nib has a spherical tip which gives a constant width trace line independent of the angle at which the nib approaches the writing surface. Still further, adjacent nibs may be of different cross-sectional sizes, a longer nib having a larger cross section than a shorter nib, so as to enhance ink flow through the nib with a longer ink path, while a smaller cross section nib permits closer passing distance.

The configuration of the cut away of the lower nib shank may take any of various forms. In general, it is preferred not to cut away the shank unnecessarily since this impairs structural support and enchances evaporative ink loss from the nib.

The cut away configuration of a particular nib shank may include a planar cut of the shank at an angle between a plane perpendicular to the nib axis and a plane parallel to the nib axis. At the latter extreme, the cut is preferably along a tangent surface of the nib, facing the adjacent nib and is met by a return cut inward from the outer shank edge.

For a better understanding of the marker tip of the present invention, reference may be made to the drawings accompanying and forming a part of this specification. In the drawings like reference characters designate the same or similar parts in various views.

DETAILED DESCRIPTION OF THE DRAWINGS

Figure 1:
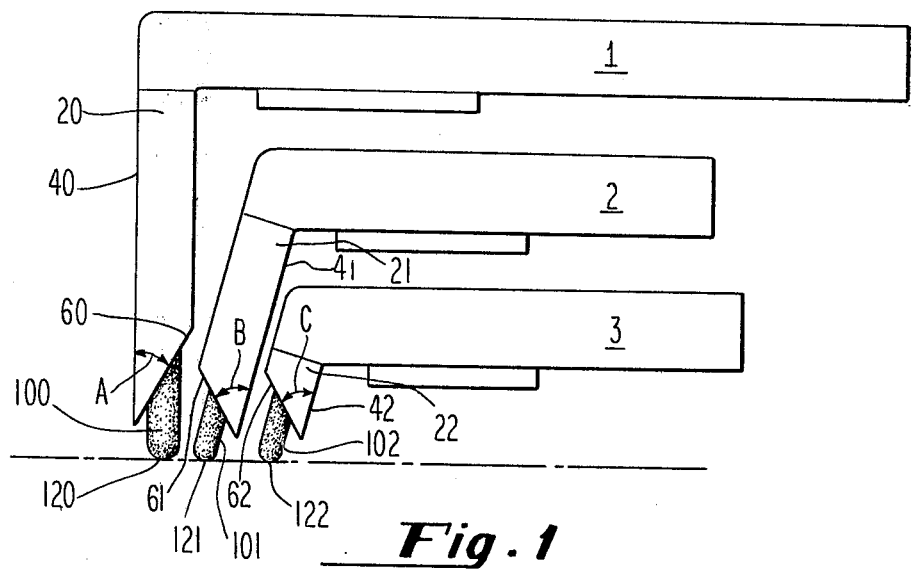
FIG. 1 is a side view of three marker tips adapted for close proximity tracing in accordance with one form of the invention, in which the shanks are bias cut at opposing angles; also shown is a typical attachment of the shanks to disposable marker bodies.

Referring now to the drawings, and particularly to FIG. 1, there is shown three disposable markers 1, 2 and 3, with their respective nibs 100, 101 and 102, in their intended close proximity tracing mode. Attached to marker pen 1 is a nib shank 20 with a cylindrical outer surface 40 surrounding and supporting nib 100 with a spherical tip 120. The bottom surface 60 of nib shank 20 is cut in such a manner as to intersect shank surface 40 to form an angle A. The axis of both nib shank 20 and nib 100 of marker pen 1 are perpendicular to the writing surface.

Attached to marker pen 2 is a nib shank 21 with a cylindrical outer surface 41, surrounding and supporting nib 101 terminating with spherical tip 121. The bottom surface 61 of nib shank 21 is cut in such a manner as to intersect nib shank surface 41 to form angle B. The axis of both nib shank 21 and nib 101 is not perpendicular to the writing surface but instead leans away from nib shank 20 of pen 1. The nib shank bottom surfaces 60 and 61, of pens 1 and 2 respectively, are cut at opposing angles in planes approaching parallelism with the axis of the adjacent nib to allow close proximity tracing of nib tips 120 and 121 without interference between nib shanks 20 and 21.

Nib shank 22 with cylindrical outer surface 42, and associated with marker pen 3, surrounds and supports nib 102 having a spherical tip 122. The bottom surface 62 of nib shank 22 intersects cylindrical surface 42 to form angle C. Angle C is equal to angle B. The axis of nib shank 22 is parallel to the axis of nib shank 21. As can be seen from the drawing, marker pen 3 is able to pass underneath marker pen 2 which in turn is able to pass underneath marker pen 1. Thus, all three pens can move laterally with minimal interference between adjacent pens. Because of the opposing angles A and B, nib 100 and nib 101 are able to trace lines within a distance less than half the sum of the diameters of nib shanks 20 and 21.

The markers of FIG. 1 are adapted by virture of the spherical configuration of tips 120, 121 and 122 to lay down a constant width tract notwithstanding their angular disposition relative to the writing surface. Moreover, nib 100, which is longer than nibs 101 and 102, may be adapted to produce comparable ink flow at the writing tip. More specifically, the impairment to ink flow by the longer ink path may be compensated by a larger nib cross section (0.77 inch diameter versus 0.55 inch diameter, typically). A smaller diameter nib, such as nib 101 in FIG. 1, also further facilitates closer passage between adjacent nibs.

Figure 2:
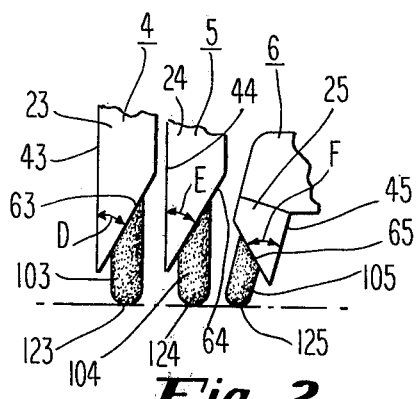
FIG. 2 is a side view of three marker tips in a configuration similar to that shown in FIG. 1 except that the two right-most pens, rather than the two left-most pens as shown in FIG. 1, include shank configurations adapted for tracing in close proximity to one another.

FIG. 2 shows a variation of the three marker configuration shown in FIG. 1 where the two right-most marker pens 5 and 6, instead of the two left-most marker pens 1 and 2, trace in close proximity. Here, the axes of nib shanks 23 and 24 are parallel and perpendicular to the writing surface. In marker pen 5, nib shank 24 surrounds and supports nib 104 having a spherical tip 124. The bottom surface 64 of nib shank 24 intersects outer cylindrical nib shank surface 44 to form angle E. Attached to marker pen 6 is nib shank 25 surrounding and supporting nib 105 having a spherical tip 125. The bottom surface 65 of nib shank 25 intersects with outer cylindrical nib shank surface 45 at angle F. The axis of nib shank 25 is not perpendicular to the writing surface but instead leans away from nib shank 24 of marker pen 5. The bottom surfaces of nib shanks 24 and 25, of pens 5 and 6 respectively, are cut at opposing angles E and F so as to allow extremely close proximity tracing between nibs 104 and 105 without interference between nib shanks 24 and 25.

Figure 3:
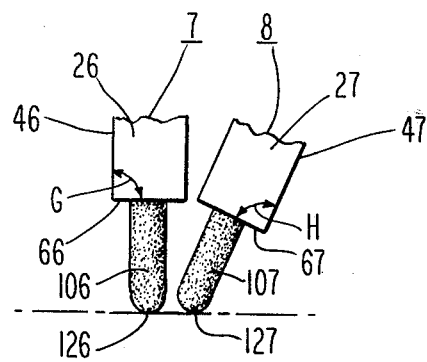
FIG. 3 is a side view of two marker tips adapted for close proximity passage by a cutback, but otherwise conventional, nib shank configuration, with nibs having sperical tips for constant width tracing.

FIG. 3 shows another embodiment of the present invention. Here, the axis of nib shank 26 is perpendicular to both the writing surface and to bottom surface 66 of nib shank 26. The axis of nib shank 27 is not perpendicular to the writing surface but instead leans away from marker pen 7. Bottom surface 67 is perpendicular to the axis of nib shank 27. Thus, in this embodiment, angles G and H are both 90°. In this conventional nib shank form, close proximity tracing between nibs 106 and 107 may be achieved by simply increasing the extension of at least one of the nibs beyond their respective nib shanks. However, this embodiment provides little nib support or protection against ink loss. The inventive feature in this embodiment of the invention is that nibs 106 and 107 are spherical in order to provide a constant width trace line, notwithstanding their angular disposition.

Figure 4:
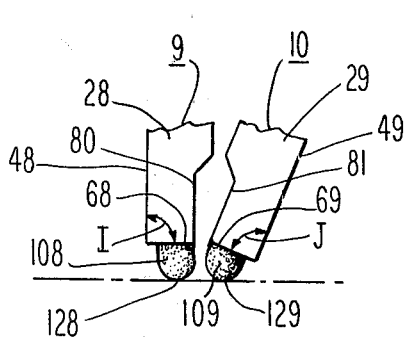
FIG. 4 is a side view of two marker tips in close proximity utilizing the form of the invention in which each nib shank is cut away only part way up its length, in a plane, parallel to the nib axis on the side adjacent the proximate nib.

FIG. 4 shows an embodiment of the present invention wherein the sides of the nib shanks 28 and 29 are cut away in planes adjacent the proximate nib to form shank surfaces 80 and 81. Nib shank surfaces 80 and 81 are both parallel to their respective nib shank axes. As in FIG. 3, the bottom surfaces 68 and 69 of nib shank 28 and 29 respectively, are perpendicular to their respective nib shank axes and hence, angles I and J are both 90°. However, because both nib shank 28 and 29 have been partially cut away on their proximate sides, nibs 108 and 109 are able to trace lines within a distance less than one-half of the sum of the diameters of nib shanks 28 and 29, without interference between nib shanks 28 and 29. As shown in FIG. 4, the nib shanks extend substantially to the spherical nib tips 128 and 129 thereby providing maximum nib support and protection against ink evaporation.

Figure 5:
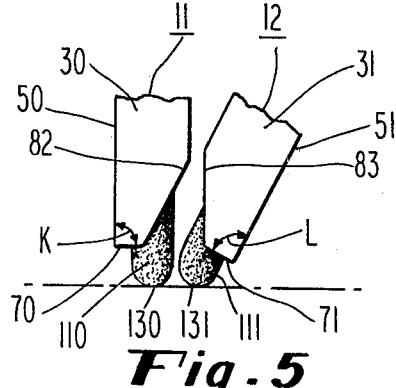
FIG. 5 is a side view of two marker tips in close proximity utilizing the form of the invention having nib shanks which are truncated bias cut at opposing angles.

FIG. 5 shows still another embodiment of the present invention. Marker pen 11 is attached to nib shank 30 surrounding and supporting nib 110 having a spherical tip 130. The axis of nib shank 30 is perpendicular to the writing surface. Nib shank 30 has an outer cylindrical surface 50 which intersects the partial bottom surface 70 to form angle K. Angle K is 90°. A corner of the end of the nib shank 30 is cut away in a plane parallel or almost parallel to the axis of the proximate nib 31. Thus, the end corner of the nib shank 30 is cut along plane 82. Plane 82 is approximately parallel to the axis of the proximate nib shank 31. Similarly, the end corner of nib shank 31 is cut off in plane 83 which is approximately parallel to the axis of proximate nib shank 30. The marker pen tips of FIG. 5 offer both maximum nib support and protection against ink evaporation.

Figure 6:
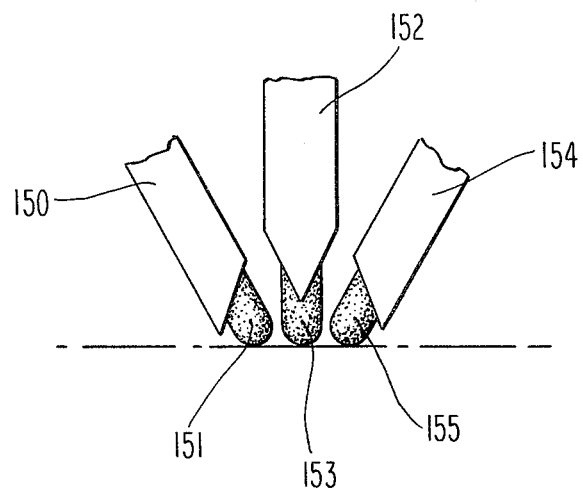
FIG. 6 illustrates a three pen set with all shanks cut away to avoid interference with one another.

FIG. 6 depicts a three-pen set in which the shank 152 of the center pen is doubly bias cut to avoid interference upon close proximity passage of central nib 153 with nibs 151, 155 associated with shanks 150 and 154 of adjacent pens on opposite sides of shank 152. Shanks 150, 154 are also cut away at their lower edges on their sides facing central nib 153 and shank 152 so as to avoid interference therewith.

In accordance with one feature of the present invention and as used in all of the embodiments shown and described, spherical nib tips enable the nibs to trace a constant width line regardless of the angle at which the nib engages the writing surface. Thus, the present invention provides a trace line suitable for electroscanning.

It will be apparent to those skilled in the art that the present invention is not limited to the particular constructions and arrangements shown and described, but that the changes and modifications may be made therein and other embodiments entirely may be devised without departing from the true spirit and scope of the invention. The appended claims should be construed so as to cover all other embodiments and all such changes and modifications.

We claim:

1. A disposable marker consisting of a nib shank surrounding and supporting a nib having a writing tip, and adjacent thereto along a common side therewith, a second disposable marker tip consisting of a nib shank surrounding and supporting a nib having a writing tip wherein said first and second marker tips are adapted to write on a common writing surface and to pass one another in close proximity at their adjacent common side, and are angularly disposed with respect to one another, wherein both said first and second nib shanks terminate to form nib shank bottom surfaces and wherein at least one of said nib shanks terminates on said adjacent side thereof further from said writing surface than on the side thereof opposite said adjacent side to minimize interference therewith upon close proximity passage, wherein at last one of said nibs includes a spherical tip adapted to lay down a constant width trace independent of its angular disposition, one of said nibs having a smaller cross section than the other of said nibs.

2. Two disposable markers, as described in claim 1, wherein at least one of said nib shank bottom surface lies in a plane that intersects the outer surface of its nib shank on said adjacent side further from said nib tip than the lowermost projecting portion of said nib shank on the opposite side thereof.

3. Two disposable markers, as described in claim 1, wherein at least one nib shank bottom surface lies in at least one plane approximately parallel to the axis of the adjacent nib.

4. Two disposable markers, as described in claim 1, wherein the bottom edge of at least one of said shank outer surfaces lies in at least one plane that is approximately parallel to the axis of its associated nib and is approximately tangent thereto on its adjacent side facing the other nib shank adjacent side.

5. Paired disposable instrument markers with nibs adapted for close proximity passage to one another, one of said nibs having a smaller cross section than the other of said nibs to permit such close proximity passage.

6. Paired disposable instrument markers with porous capillary ink paths and nibs, said markers adapted for close proximity tracing, one of said marker nib shanks being longer than the other of said markers, said longer marker nib having a larger cross section than said shorter nib, whereby the ink flow through said longer path is enhanced to compensate for said longer path.

7. Two disposable marker tips with nibs and protective nib shanks surrounding and supporting said nibs, said nibs being angularly disposed with respect to one another and adapted for close proximity passage with one another on an adjacent side thereof, the lower extremities of each of said nib shanks being cut away on their adjacent sides to minimize interference therebetween in the course of close proximity passage.

8. Two disposable markers as recited in claim 7, in combination with a third similar tip adjacent one of said first two tips and adapted similarly for close proximity passage therewith on a side thereof opposite said common adjacent side of said first two tips.

* * * * *